United States Patent
Jones et al.

[11] Patent Number: 6,148,601
[45] Date of Patent: Nov. 21, 2000

[54] ENGINE FUEL CONTROL SYSTEM AND METHOD

[75] Inventors: Anthony Charles Jones; Mark M. Harris; David R. Ripley, all of San Diego; Malcolm J. McArthur, Fallbrook, all of Calif.

[73] Assignee: Hamilton Sundstrand Corporation, Windsor Locks, Conn.

[21] Appl. No.: 09/075,130

[22] Filed: May 8, 1998

[51] Int. Cl.$^7$ .................................................... F02C 9/26
[52] U.S. Cl. ........................................ 60/39.03; 60/39.281
[58] Field of Search ............................. 60/39.281, 39.03

[56] References Cited

U.S. PATENT DOCUMENTS

| | | |
|---|---|---|
| 4,280,323 | 7/1981 | Jersey et al. . |
| 4,682,469 | 7/1987 | Maynard . |
| 4,817,376 | 4/1989 | Brocard et al. . |
| 4,938,418 | 7/1990 | Halvorsen . |
| 5,020,315 | 6/1991 | Leachman, Jr. et al. . |
| 5,115,635 | 5/1992 | Jennings et al. . |
| 5,137,046 | 8/1992 | Sollman et al. . |
| 5,274,996 | 1/1994 | Goff et al. ............................. 60/39.281 |
| 5,447,023 | 9/1995 | Meisner et al. . |

OTHER PUBLICATIONS

Holman, J. P. "Experimental Methods of Engineers", McGraw–Hill, pp. 188–191, 1971.

*Primary Examiner*—Timothy S. Thorpe
*Assistant Examiner*—Ehud Gartenberg
*Attorney, Agent, or Firm*—Wood, Phillips, VanSanten, Clark & Mortimer

[57] ABSTRACT

Accuracy and predictability are provided in a fuel control system for an engine system including a fuel supply and a combustion chamber. The fuel control system includes at least one fuel injector having a calibrated nozzle to direct a fuel flow from the fuel supply into the combustion chamber of the engine, a servo valve connected between the fuel supply and the calibrated nozzle to meter the fuel flow from the fuel supply to the calibrated nozzle, a pressure transducer operably associated with the calibrated nozzle to measure a pressure drop in the fuel flow across the calibrated nozzle, and a controller operably associated with the pressure transducer and the servo valve to control the metering of the fuel flow by the servo valve. The calibrated nozzle has a known fuel flow vs. pressure drop characteristic. The controller controls the metering of the fuel flow by the servo valve based on the pressure drop measured by the pressure transducer and the known fuel flow vs. pressure drop characteristic of the calibrated nozzle.

13 Claims, 4 Drawing Sheets

ENGINE FUEL CONTROL SYSTEM AND METHOD

FIELD OF THE INVENTION

This invention relates to engine fuel control systems, and more particularly, to fuel control systems for small gas turbine engines.

BACKGROUND OF THE INVENTION

Small gas turbine engines are particularly sensitive to the fuel flow rate into the combustor of the engine. Accordingly, such engines require an especially accurate and predictable fuel control. For electronically based fuel control systems, this requires accuracy between the electronic control and the actual fuel flow. However, elaborate fuel measuring systems with feedback control are not always practical in systems, such as small gas turbine engines, that require low fuel flows and/or have low weight and cost requirements. Thus, for such systems, a typical practice is to use a servo valve 10 in an open loop system, such as shown in FIG. 1, wherein a fuel flow command signal 12 into a controller 14 produces a current input signal 16, typically in the range of 0 to 150 ma, which is converted to a metered fuel flow 18 from the servo valve 10, typically in the range of 20 to 400 pph. The metered fuel flow 18 is directed into a combustor 20 by one or more combustor nozzles 22. The metering of the fuel flow 18 is provided by a current driven torque motor 24 which controls the position of a clevis or flapper 26 on a metering valve 28 in the servo valve 10, thereby producing an orifice area that is proportional to the amplitude of the current input signal 16. This can produce a metered fuel flow 18 proportional to the current input signal 16 if the pressure drop $\Delta P_s$ of the fuel flow across the metering valve 28 is controlled to a fixed or predictable value by either a restricting or bypassing pressure drop control valve 30. However, for some systems, this arrangement does not provide the required accuracy and predictability.

Thus, there is a need for a new and improved fuel control system that can provide the predictability and accuracy required by some engine systems, such as small gas turbine engines. There is a further need for such a fuel control system that does not add undue weight and/or complexity and/or cost.

SUMMARY OF THE INVENTION

It is the principal object of the invention to provide a new and improved fuel control system for an engine system including a fuel supply and a combustion chamber. This result is achieved in a fuel control system that utilizes a servo valve for metering the fuel flow to one or more calibrated nozzles which direct the metered fuel flow into a combustion chamber or combustor of an engine. The pressure drop across the one or more calibrated nozzles is used to determine the actual fuel flow rate to the engine, which is then used to correct the control signal into the servo valve to provide more accurate and predictable control of the fuel flow rate.

According to one aspect of the invention, a fuel control system includes at least one calibrated nozzle to direct a fuel flow from a fuel supply into a combustion chamber of an engine, a servo valve connected between the fuel supply and the calibrated nozzle(s) to meter the fuel flow from the fuel supply to the calibrated nozzle(s), a pressure transducer operably associated with the calibrated nozzle(s) to measure a pressure drop in the fuel flow across the calibrated nozzle(s), and a controller operably associated with the pressure transducer and the servo valve to control the metering of the fuel flow by the servo valve. The calibrated nozzle(s) has a known fuel flow vs. pressure drop characteristic. The controller controls the metering of the fuel flow by the servo valve based on the pressure drop measured by the pressure transducer and the known fuel flow vs. pressure drop characteristic of the calibrated nozzle(s).

According to another aspect of the invention, the servo valve has a predicted relationship between the metered fuel flow and a control signal amplitude from the controller. The controller is configured to correct the predicted relationship based on a measured flow rate determined from the pressure drop measured by the pressure transducer and the known fuel flow vs. pressure drop characteristic of the calibrated nozzle(s).

According to yet another aspect of the invention, the pressure transducer generates a first signal representative of the measured pressure drop and the controller is operably associated with the pressure transducer to receive the first signal therefrom. The controller is configured to generate a second signal representative of the actual fuel flow through the calibrated nozzle(s) based on the first signal and the known fuel flow vs. pressure drop characteristic of the calibrated nozzle(s). The controller is operably associated with the servo valve to control the metering of the fuel flow by the servo valve based on a comparison between the second signal and a third signal representative of a desired fuel flow to the engine.

In accordance with one aspect of the invention, a method provides a desired fuel flow rate to an engine through a fuel circuit including at least one nozzle to direct the fuel flow into a combustion chamber of the engine and a servo valve to meter the fuel flow to the nozzle(s). The method includes the steps of calibrating the nozzle(s) to determine the nozzle(s) fuel flow vs. pressure drop characteristic, measuring a pressure drop in the fuel flow across the nozzle(s) during operation of the engine, determining a fuel flow rate based on the measured pressure drop and the fuel flow vs. pressure drop characteristic of the nozzle(s), and controlling the metering of the fuel flow by the servo valve based on a comparison between the determined fuel flow rate and the desired fuel flow rate.

According to another aspect of the invention, a method provides a desired fuel flow rate to an engine through a fuel circuit including at least one nozzle to direct the fuel flow into the combustion chamber of the engine and a servo valve to meter the fuel flow to the nozzle(s) in response to a control signal. The method includes the steps of calibrating the nozzle(s) to determine a fuel flow vs. pressure drop characteristic for the nozzle(s), calibrating the servo valve to determine a predicted fuel flow vs. control signal relationship for the servo valve, measuring a pressure drop in the fuel flow across the nozzle(s) during operation of the engine, determining a fuel flow rate based on the measured pressure drop in the fuel flow vs. pressure drop characteristic of the nozzle(s), and correcting the predicted fuel flow vs. control signal relationship for the servo valve based on the determined fuel flow rate.

Other objects and advantages will become apparent from the following specification taken in connection with the accompanying drawings.

DETAILED DESCRIPTION OF THE PREFERRED EMBODIMENTS

Figure 1:
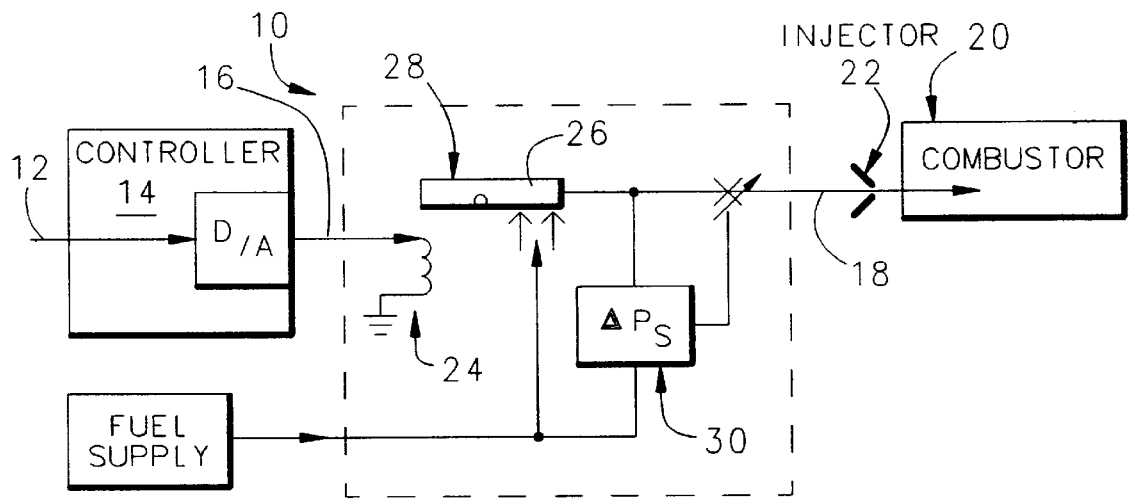
FIG. 1 is a diagrammatic view of a prior art fuel control system for an engine.
Figure 2:
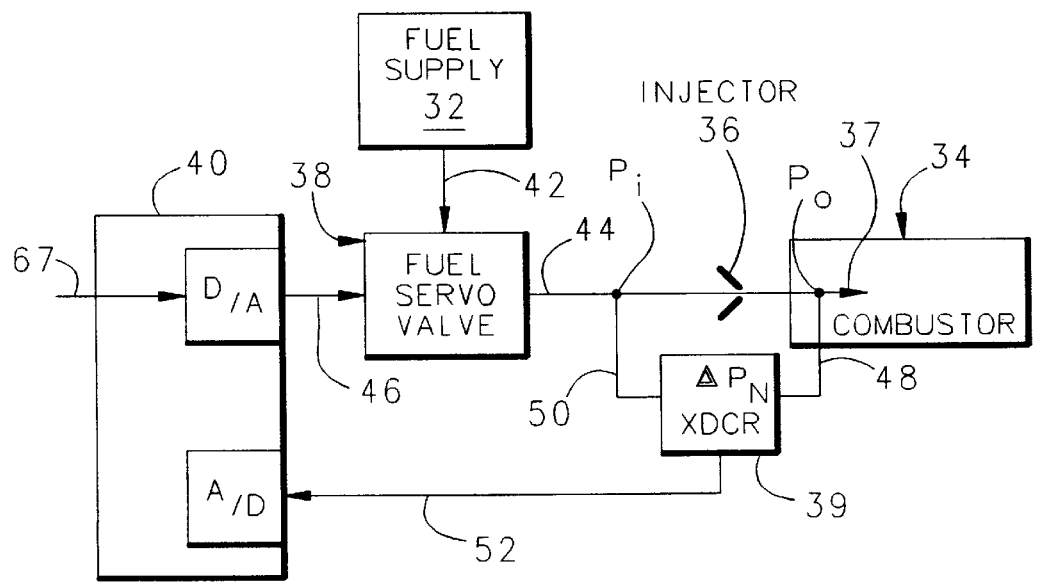
FIG. 2 is a diagrammatic view of a fuel control system for an engine embodying the present invention.

With reference to FIG. 2, a fuel control system is shown for an engine system including a fuel supply 32 and a combustion chamber or combustor 34. The fuel control system includes one or more calibrated nozzles 36 (reference to a "nozzle 36" refers to both the use of a single nozzle or a plurality of nozzles) to direct a fuel flow 37 from the fuel supply 32 into the combustion chamber 34; a metering or servo valve 38, such servo valve 10 shown in FIG. 1 and described in the Background section, connected between the fuel supply 32 and the calibrated nozzle 36 to meter the fuel flow 37 from the fuel supply 32 to the nozzle 36; a pressure transducer 39 operably associated with the nozzle 36 to measure the pressure drop in the fuel flow 37 across the nozzle 36; and a controller 40 operably associated with the pressure transducer 39 and the servo valve 38 to control the metering of the fuel flow 37 by the servo valve 38.

The nozzle 36 is accurately made and calibrated to determine the fuel flow rate vs. pressure drop characteristic for the one or more nozzles 36. In this regard, it should be understood that when a plurality of nozzles 36 are provided, the nozzles are calibrated as a group to determine the characteristic for the total fuel flow through all of the nozzles 36 vs. the pressure drop across all of the nozzles 36. If the nozzles 36 are fed from a nozzle manifold, it may be most convenient to determine the characteristic based on the pressure drop across the manifold and all of the nozzles 36. Typically, the pressure drop across the nozzle 36 will be proportional to the square of the fuel flow rate through the one or more nozzles 36, and the fuel flow vs. pressure drop characteristic can be represented by a single constant for the nozzle. However, the fuel flow vs. pressure drop characteristic for the nozzle 36 may be represented by a more complex relationship.

A flow path or conduit 42 directs fuel flow from the fuel supply 32 to the servo valve 38 and a flow path or conduit 44 directs the fuel flow 37 from the servo valve 38 to the nozzle 36. The servo valve 38 meters the fuel flow to the nozzle 36 in response to a control signal 46 from the controller 40. As discussed in the Background section, the control signal 46 is typically a current input signal in the range of 0–150 ma.

Preferably, the pressure transducer 39 is connected to the interior of the combustion chamber 34 by a pressure tap 48 to provide a reference pressure $P_o$ for the outlet of the nozzle 36. The pressure transducer 39 is connected to the inlet side of the nozzle 36 by a pressure tap 50 to provide a reference pressure $P_i$ for the inlet of the nozzle 36. The pressure transducer 39 transmits a signal 52 to the controller 40 representative of the pressure drop, $\Delta P = P_i - P_o$.

Figure 3:
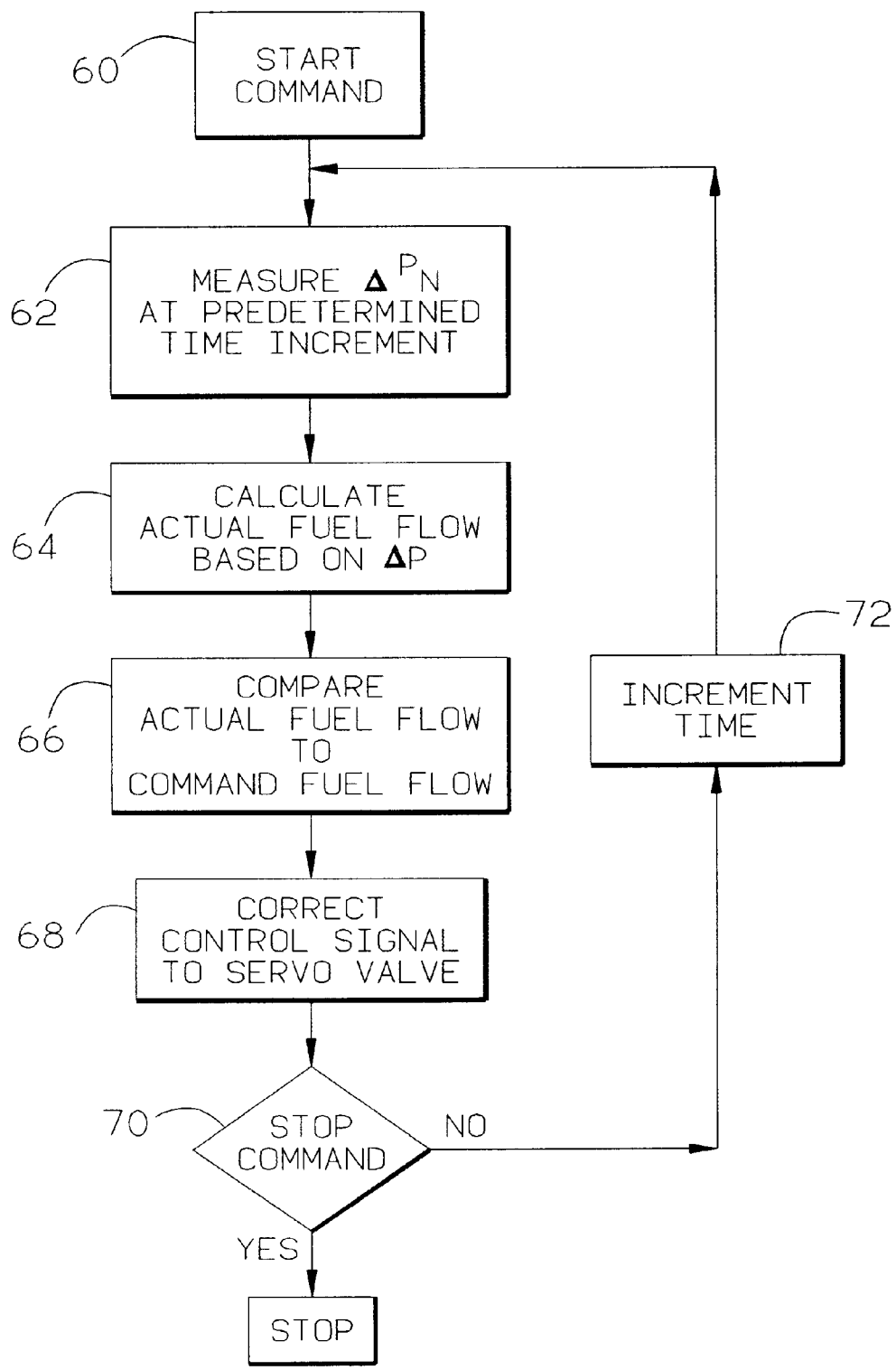
FIG. 3 is a flow chart showing an operating procedure for the fuel control system of FIG. 2.

According to one embodiment of the invention, the fuel control system is configured to provide closed loop control of the fuel flow 37 to the combustion chamber 34. In this embodiment, the controller 40 is configured to perform the procedure illustrated by the flow chart shown in FIG. 3. Specifically, after receiving the start command shown at the block 60, the controller measures the pressure drop $\Delta P_n$ across the nozzle 36 using the signal 52 from the pressure transducer 39, as shown at the block 62. Next, the controller 40 calculates an actual rate of the fuel flow 37 through the nozzle 36 based on the measured value of $\Delta P_n$ and the fuel flow vs. pressure drop characteristic of the nozzle 36, as shown at the block 64. The controller 40 then compares the actual fuel flow to a commanded or desired fuel flow signal 67 (see FIG. 2) input into the controller 40, as shown at the block 66. Based on this comparison, the amplitude of the control signal 46 is corrected by the controller 40 so that the actual fuel flow is equal to or within an acceptable range of the commanded fuel flow 67 as shown at the block 68. As shown at the blocks 70 and 72, the controller increments time and repeats steps 62–68 until a stop engine command is received.

Figure 4:
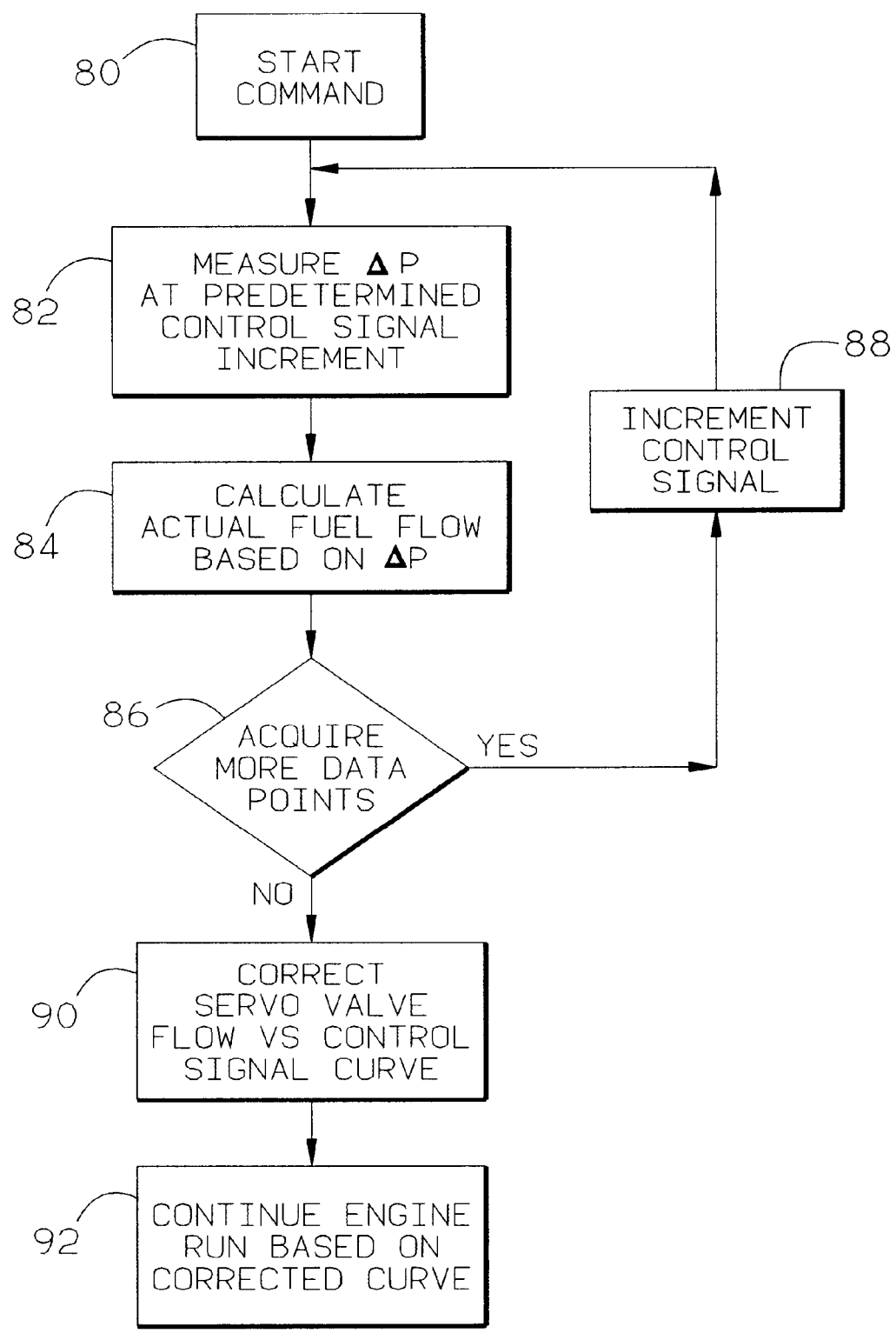
FIG. 4 is a flow chart showing another operating procedure for the fuel control system of FIG. 2.

According to another embodiment of the invention, the servo valve 38 has a predicted relationship between the metered fuel flow 37 to the nozzle 36 and the control signal 46 from the controller 40. In this embodiment, the predicted relationship is programmed into the controller 40 and the controller 40 is configured to perform the procedure represented by the flow chart shown in FIG. 4. After receiving the start command shown at the block 80, the controller 40 uses the signal 52 from the transducer 39 to measure $\Delta P_n$ when the amplitude of the control signal 46 is at a predetermined value, as shown at the block 82. The controller 40 then uses the measured $\Delta P_n$ to calculate the actual rate of the fuel flow 37 based upon the fuel flow vs. pressure drop characteristic for the nozzle 36, as shown at the block 84. Depending upon the required accuracy for the fuel flow rate 37 and the complexity of the predicted relationship between the metered fuel flow 37 and the control signal 46 for the servo valve 38, the controller 40 will either (a) increment the amplitude of the control signal 46 and acquire more data points of $\Delta P_n$ for incremented amplitudes of the control signal 46, as shown at the blocks 86 and 88, or (b) use the already acquired data point or points to correct the predicted relationship between the metered fuel flow 37 and the control signal 46 for the servo valve 38 by "curve fitting" the relationship to the acquired data points, as shown at the block 90. After the relationship has been corrected, the controller 40 continues the engine run using the corrected relationship to control the servo valve 38 to achieve a more accurate rate of the fuel flow 37 to the combustion chamber 34, as shown at the block 92.

Figure 5:
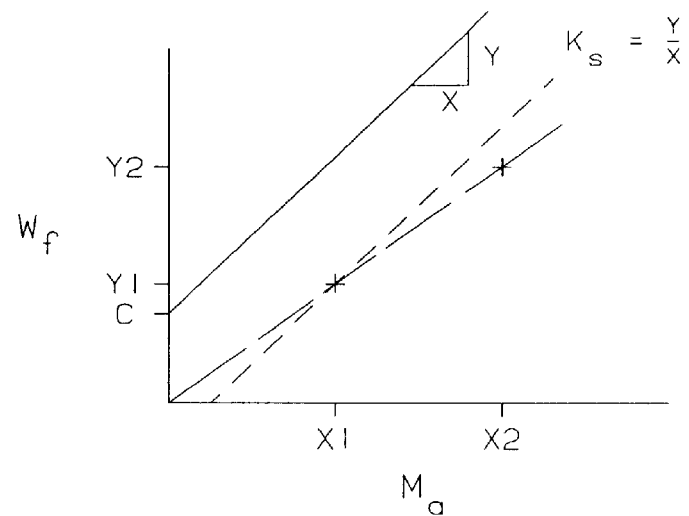
FIG. 5 is a graphical representation of fuel flow vs. input signal amplitude for a servo valve of the present invention.

The above relationship is best explained with reference to one specific embodiment of the invention. In this embodiment, the predicted relationship between the metered fuel flow 37 and the amplitude of the control signal 46 for the servo valve 38 can be represented by the equation $W_f = k_s \times m_a + C$, where $W_f$ equals the predicted rate of the fuel flow 37, $m_a$ equals the amplitude of the control signal 46, C equals a constant, and $k_s$ equals a constant, as shown by solid line in FIG. 5. The controller 40 is configured to (a) determine a first actual flow rate Y1 at a first value X1 of $m_a$, and (b) correct the constant C so that $w_f$ is equal to the first actual flow rate Y1 at the first value X1 of $m_a$, as shown by the short dash line in FIG. 5. If more accuracy is required, the controller 40 is configured to determine a second measured flow rate Y2 at a second value X2 of $m_a$ and (b) correct both constants C and $k_s$ so that $w_f$ is equal to the actual flow rates Y1 and Y2 at their corresponding values X1 and X2 of $m_a$, as shown by the long dash line in FIG. 5.

It should be understood that the predicted relationship between the metered fuel flow 37 and the amplitude of the control signal 46 for the servo valve 38 may be more complex (i.e., non-linear) than the above described example and, accordingly, may require the controller 40 to acquire more data points and utilize more complex curve fitting techniques known to those skilled in the art to correct the predicted relationship.

Figure 6:
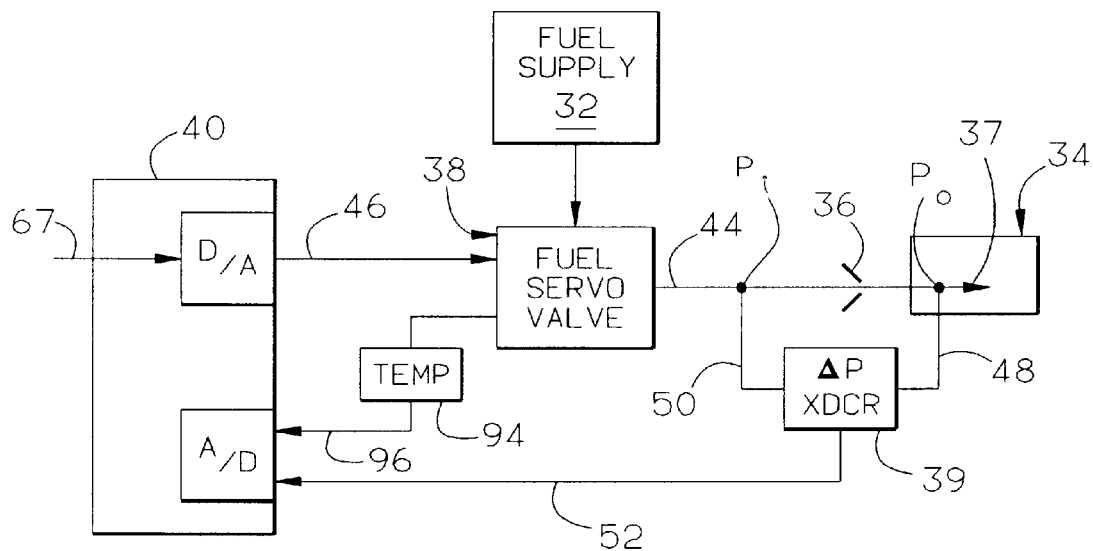
FIG. 6 is a modified version of the fuel control system of FIG. 2.

FIG. 6 shows a modification to the fuel control system shown in FIG. 2. This embodiment of the fuel control system adds a temperature transducer 94 that senses the fuel temperature at the fuel servo valve 38 and transmits a signal 96 to the controller 40 representative of the fuel temperature at the fuel servo valve 38. The controller 40 is configured to correct the fuel flow vs. pressure drop characteristic for the nozzle 36 and/or the predicted relationship between the metered fuel flow 37 and the amplitude of the control signal 46 for the servo valve 38 in a predetermined fashion to compensate for the temperature effects on one or more of the following: fuel density, fuel viscosity, the mechanisms of the servo valve 16, and the geometry of the one or more nozzles 36. This temperature compensation can be used with any of the previously described configurations of the controller 40.

It should be understood that the invention may be used to improve the accuracy of the fuel flow for any type of metering or servo valve 38. Indeed, by way of example, for the servo valve 10 described in the background section, the invention can eliminate the need to hold the pressure drop across the metering valve 10 constant, thereby eliminating the need for the pressure drop control valve 30. As previously discussed, in this type of valve 10 the pressure drop is held constant across the metering valve 28 so that the metered fuel flow 18 is proportional to the current input signal 16. With the closed loop control embodiment described in connection with FIG. 3, the accuracy in the flow 18 provided by the pressure drop control valve 30 may become redundant to the accuracy in the fuel flow 18 provided by the closed loop control embodiment which corrects the metered flow 18 based on the measured pressure drop across the nozzle 36. Furthermore, with respect to the embodiment of the invention discussed in connection with FIG. 4, the pressure drop control valve 30 may not be required because, as previously discussed, the invention can be used to correct a predicted relationship that is non-linear. Accordingly, no limitation to a specific type of metering or servo valve 38 is intended except insofar as expressly stated in the claims.

It is anticipated that the fuel control system will be particularly useful with gas turbine engines in the form of small turbo jets, such as those disclosed in U.S. Pat. Nos. 5,207,042, issued May 4, 1993 to Rogers et al and 4,974, 742, issued Jan. 3, 1989 to Shekleton et al, the entire disclosures of which are herein incorporated by reference. However, it should be understood that the invention may find utility in other applications and that no limitation to the use as a fuel control system for a small gas turbine engine is intended except insofar as expressly stated in the appended claims.

What is claimed is:

1. A fuel control system for an engine system including a fuel supply and a combustion chamber, the system comprising:

at least one fuel injector with a calibrated nozzle to direct a fuel flow from a fuel supply into a combustion chamber of an engine, the calibrated nozzle having a known fuel flow vs. pressure drop characteristic;

a servo valve connected between the fuel supply and the calibrated nozzle to meter the fuel flow from the fuel supply to the calibrated nozzle;

a pressure transducer operably associated with the at least one calibrated nozzle to measure a pressure drop in the fuel flow across the calibrated nozzle; and a controller operably associated with the pressure transducer and the servo valve to control the metering of the fuel flow by the servo valve based on the pressure drop measured by the pressure transducer and the known fuel flow vs. pressure drop characteristic of the calibrated nozzle.

2. The fuel control system of claim 1 wherein the servo valve has a predicted relationship between the metered fuel flow and a control signal amplitude from the controller, and the controller is configured to correct the predicted relationship based on a flow rate determined from the pressure drop measured by the pressure transducer and the known fuel flow vs. pressure drop characteristic of the calibrated nozzle.

3. The fuel control system of claim 2 wherein the predicted relationship is represented by the equation $wf=k_s \times m_a + C$, where $w_f$=predicted fuel flow, $m_a$=control signal amplitude, C=a constant, and $k_s$=a constant.

4. The fuel control system of claim 3 wherein the controller is configured to (a) determine a first flow rate at a first value of $m_a$, and (b) correct the constant C so that $w_f$ is equal to the first flow rate at the first value of $m_a$.

5. The fuel control system of claim 3 wherein the controller is configured to (a) determine a first flow rate at a first value of ma, and (b) determine a second flow rate at a second value of $m_a$, and (c) correct the constants C and $k_s$ so that $w_f$ is equal to the first flow rate at the first value of $m_a$ and equal to the second flow rate at the second value of $m_a$.

6. The fuel control system of claim 2 wherein the predicted relationship is also a function of fuel temperature entering the servo valve.

7. The fuel control system of claim 2 wherein the known flow characteristic is also a function of fuel temperature entering the calibrated nozzle.

8. A fuel control system for an engine including a combustion chamber, the system comprising:

a fuel supply;

at least one fuel injector with a calibrated nozzle to direct a fuel flow from the fuel supply into a combustion chamber of an engine, the calibrated nozzle having a known fuel flow vs. pressure drop characteristic;

a servo valve connected between the fuel supply and the calibrated nozzle to meter the fuel flow from the fuel supply to the calibrated nozzle;

a pressure transducer operably associated with the calibrated nozzle to measure a pressure drop in the fuel flow across the at least one calibrated nozzle and generate a first signal representative of the measured pressure drop; and a controller operably associated with the pressure transducer to receive the first signal therefrom, the controller configured to generate a second signal representative of the actual fuel flow through the calibrated nozzle based on the first signal and the known fuel flow vs. pressure drop characteristic of the calibrated nozzle, the controller operably associated with the servo valve to control the metering of the fuel flow by the servo valve based on a comparison between the second signal and a third signal representative of a desired fuel flow to the engine.

9. A method of providing a desired fuel flow rate to an engine through a fuel circuit including at least one fuel injector with a calibrated nozzle to direct the fuel flow into a combustion chamber of the engine and a servo valve to meter the fuel flow to the nozzle, the method including the steps of:

calibrating the nozzle to determine the at least one nozzle's fuel flow vs. pressure drop characteristic;

measuring a pressure drop in the fuel flow across the nozzle during operation of the engine;

determining a fuel flow rate based on the measured pressure drop and the fuel flow vs pressure drop characteristic of the nozzle; and controlling the metering of the fuel flow by the servo valve based on a comparison between the determined fuel flow rate and the desired fuel flow rate.

10. A method of providing a desired fuel flow rate to an engine through a fuel circuit including at least one fuel injector with a calibrated nozzle to direct the fuel flow into a combustion chamber of the engine and a servo valve to meter the fuel flow to the nozzle in response to a control signal, the method including the steps of:

calibrating the nozzle to determine a fuel flow vs. pressure drop characteristic for the nozzle;

calibrating the servo valve to determine a predicted fuel flow vs. control signal relationship for the servo valve;

measuring a pressure drop in the fuel flow across the nozzle during operation of the engine;

determining a fuel flow rate based on the measured pressure drop and the fuel flow vs pressure drop characteristic of the nozzle; and correcting the predicted fuel flow vs. control signal relationship for the servo valve based on the determined fuel flow rate.

11. The fuel control system of claim 1 further comprising a pressure tap connecting the pressure transducer to the interior of the combustion chamber to provide a reference pressure for an outlet of the calibrated nozzle; and a second pressure tap connected to an inlet side of the calibrated nozzle to provide a reference pressure for the inlet side of the at least one, calibrated nozzle.

12. The fuel control system of claim 8 further comprising a pressure tap connecting the pressure transducer to the interior of the combustion chamber to provide a reference pressure for an outlet of the calibrated nozzle; and a second pressure tap connected to an inlet side of calibrated nozzle to provide a reference pressure for the inlet side of the calibrated nozzle.

13. The fuel control system of claim 1 wherein the at-least-one fuel injector is a plurality of fuel injectors with calibrated nozzles to direct the fuel flow from the fuel supply into the combustion chamber, the plurality of calibrated nozzles having the known fuel flow vs. pressure drop characteristic.

* * * * *